United States Patent
Charij

(10) Patent No.: US 10,297,116 B2
(45) Date of Patent: May 21, 2019

(54) CASH DRAWER

(71) Applicant: Smart Drawer Ltd., Reading (GB)

(72) Inventor: Peter Gregory Charij, Reading (GB)

(73) Assignee: Smart Drawer Ltd., Reading (GB)

( * ) Notice: Subject to any disclaimer, the term of this patent is extended or adjusted under 35 U.S.C. 154(b) by 204 days.

(21) Appl. No.: 15/372,166

(22) Filed: Dec. 7, 2016

(65) Prior Publication Data
US 2017/0162005 A1 Jun. 8, 2017

(30) Foreign Application Priority Data

Dec. 8, 2015 (GB) .................................. 1521633.6

(51) Int. Cl.
| | | |
|---|---|---|
| *G01G 19/414* | (2006.01) | |
| *G07G 1/00* | (2006.01) | |
| *G01G 19/393* | (2006.01) | |
| *G01G 19/415* | (2006.01) | |

(52) U.S. Cl.
CPC ......... *G07G 1/0009* (2013.01); *G01G 19/393* (2013.01); *G01G 19/414* (2013.01); *G01G 19/415* (2013.01); *G07G 1/0018* (2013.01); *G07G 1/0027* (2013.01)

(58) Field of Classification Search
CPC .. G01G 19/393; G01G 19/414; G01G 1/0018; G01G 1/0027; G01G 19/415; G01G 1/0009
USPC .................................................. 177/1, 25.13
See application file for complete search history.

(56) References Cited

U.S. PATENT DOCUMENTS

| | | | |
|---|---|---|---|
| 2,314,387 A | 3/1943 | Carlsson | |
| 2,995,034 A | 8/1961 | Boiten | |
| 3,520,206 A * | 7/1970 | Wirth | G01G 23/18 235/61 PS |
| 4,387,777 A | 6/1983 | Ash | |
| 4,447,885 A | 5/1984 | Biss | |
| 4,512,428 A | 4/1985 | Bullivant | |
| 4,522,275 A | 6/1985 | Anderson | |
| 4,646,767 A | 3/1987 | Hikita | |
| 4,703,816 A | 11/1987 | Saner | |
| 5,193,626 A | 3/1993 | Jacob | |
| 5,600,104 A | 2/1997 | McCauley et al. | |

(Continued)

FOREIGN PATENT DOCUMENTS

| | | |
|---|---|---|
| EP | 0670480 A1 | 9/1995 |
| EP | 0724242 A2 | 7/1996 |

(Continued)

OTHER PUBLICATIONS

Wikipedia, "Kinematic coupling", downloaded Feb. 17, 2017, 1 page.

(Continued)

*Primary Examiner* — Jacques M Saint Surin
(74) *Attorney, Agent, or Firm* — Young Basile Hanlon & MacFarlane, P.C.

(57) ABSTRACT

A cash drawer and a method for determining the change in contents of a cash tray is provided. The cash drawer includes: at least two force measuring devices; and a cash tray mounted on the force measuring devices, the cash tray including a plurality of containers, each container for holding a plurality of cash tokens, wherein the cash tray is coupled to each of the force measuring devices through a kinematic mount.

20 Claims, 9 Drawing Sheets

(56) References Cited

U.S. PATENT DOCUMENTS

| | | |
|---|---|---|
| 5,750,937 A | 5/1998 | Johnson et al. |
| 5,756,977 A | 5/1998 | Biss |
| 5,819,901 A | 10/1998 | Filiberti |
| 5,954,576 A | 9/1999 | Coulter et al. |
| 6,176,774 B1 | 1/2001 | Filiberti et al. |
| 7,992,768 B2 | 8/2011 | Benigno et al. |
| 9,460,589 B2 * | 10/2016 | Charij ................. G07G 1/0018 |
| 2003/0047603 A1 | 3/2003 | Lustenberger et al. |
| 2003/0135406 A1 | 7/2003 | Rowe |
| 2009/0236431 A1 * | 9/2009 | Benigno ............. G01G 19/414 235/7 R |
| 2010/0282520 A1 | 11/2010 | Lucas et al. |
| 2011/0209927 A1 | 9/2011 | Honda et al. |

FOREIGN PATENT DOCUMENTS

| | | |
|---|---|---|
| EP | 1956562 A2 | 8/2008 |
| GB | 2404768 A | 2/2005 |
| GB | 2407194 A | 4/2005 |
| GB | 2410363 A | 7/2005 |
| GB | 2411035 A | 8/2005 |
| GB | 2417093 A | 2/2006 |
| GB | 2497368 A | 6/2013 |
| GB | 2500587 A | 10/2013 |
| GB | 2514990 A | 12/2014 |
| JP | 2007087052 A | 4/2007 |
| JP | 04259097 B2 | 4/2009 |
| JP | 2010061560 A | 3/2010 |
| WO | 2004013818 A1 | 2/2004 |
| WO | 2005106812 A1 | 11/2005 |

OTHER PUBLICATIONS

European Search Report dated Feb. 23, 2017 from corresponding EP Application No. 16202717.1, 3 pages.

\* cited by examiner

CASH DRAWER

CROSS-REFERENCE TO RELATED APPLICATIONS

This application claims the priority from UK Patent Application No. 1521633.6, filed on Dec. 8, 2015, the disclosure of which is incorporated herein by reference in its entirety.

TECHNICAL FIELD

The present disclosure relates to a cash drawer for holding cash tokens. Cash tokens include, but are not limited to, coins, notes, vouchers and the like.

BACKGROUND

Typically, a point of sale (POS) system includes a cash drawer for holding cash tokens. The cash drawer includes multiple compartments, each for holding a different value token.

At the start of an operating period of the POS system (the start of the working day, shift period, or other working period) the cash drawer is provided with a known starting content. Over the course of the operating period, the content of the cash drawer changes as cash tokens are added and removed from the cash drawer as payment and change.

If one or more of the compartments becomes full the compartment(s) has to be emptied, leaving a small amount of tokens to be used to make change. If one or more of the separate compartments becomes empty, more tokens may need to be added, for making change.

At the end operating period, the total contents of the drawer is counted to determine a final content. This can be compared to information about cash transactions involving the particular POS system, to determine if the content is correct (reconciliation).

Typically, the count at the end of the day is undertaken manually, which can be time consuming, especially where cash trays from multiple POS systems need to be reconciled (such as in a supermarket or department store).

Also, current POS systems rely on the operator to identify when compartments in the cash drawer need to be emptied/refilled.

In addition, errors or fraud by operators of a POS system can only be identified after reconciliation at the end of the operating period, and to ensure that any errors or fraud are tracked to the responsible operator, conventional cash drawers must be reconciled every time the operator changes.

Furthermore, conventional POS systems do not keep track the contents of a cash drawer throughout its operation—only the starting content and content at reconciliation are known. This information can be useful for insurance purposes, where the contents are lost (for example through fire or theft).

SUMMARY

According to a first aspect of the disclosure, there is provided a cash drawer comprising: at least two force measuring devices; and a cash tray mounted on the force measuring devices, the cash tray comprising a plurality of containers, each container for holding a plurality of cash tokens, wherein the cash tray is coupled to each of the force measuring devices through a kinematic mount.

The kinematic mounts may be constructed and arranged such that a downward force on the cash tray is converted into a movement of the mount, such that the cash tray is not deflected by the force.

The kinematic mount may include: a first member fixed relative to one of the cash tray or a force measuring device; a second member, fixed relative to the other of the cash tray or a force measuring device at a first end, and slidably engaged with the fixed member at a second end, opposite the first, wherein a downward force on the cash tray causes sliding of the first member relative to the second member.

The first and second member may be constrained to slide along a first axis only, such that the mount has one degree of translational freedom.

The first member may comprise a channel, and the second member may comprise a strut having a rotating member at the second end arranged to co-operate with the channel, and rotate in the channel.

The two or more force measuring devices may be fixed to the base of the cash drawer, the base for fixing the cash drawer to a stable surface.

The cash tray may be removably coupled to the cash drawer.

The cash drawer may comprise: a first kinematic mount arranged to couple a first force measuring device to the cash tray; and a second kinematic mount arranged to couple a second force measuring device to the cash tray.

A first force measuring device may be arranged at a first edge of the cash tray, and a second force measuring device may be arranged at a second edge of the cash tray, opposite and parallel to the first edge.

The first force measuring device may be arranged at a mid-point of the first edge, and the second force measuring device be arranged at a mid-point of the second edge.

The first force measuring device may be arranged at an intersection between the first edge and a third edge of the cash tray, and the second force measuring device may be arranged at an intersection between the second edge and the third edge, the third edge running between the first edge and second edge.

The cash drawer may comprise: a third force measuring device.

The first, second and third force measuring devices may be arranged at the vertices of a triangle.

The third force measuring device may be arranged at an intersection between two edges of the cash tray.

The third force measuring device may be arranged at a midpoint on an edge of the cash tray.

The cash tray may be divided into the plurality of compartments such that there are two or more compartments along the first edge, and two or more compartments between the first edge and the second edge.

The cash drawer may comprise eight compartments, arranged in an array two compartments wide, and four compartments long.

The cash tray may be divided into a plurality of compartments such that there is one compartment along the first edge, and two or more compartments between the first edge and the second edge. The cash drawer only two force measuring devices.

The cash drawer may comprise four compartments, arranged in an array one compartments wide, and four compartments long.

The cash drawer may comprise a plurality of cash trays, each cash tray with two or more associated force measuring device.

The cash drawer may comprise an interlocking system arranged to detachably couple the plurality of cash trays, such that the cash trays can move independently when not coupled, and can move together when coupled.

The interlocking system may comprise a detachable handle for removing the plurality of coupled cash trays from the cash drawer simultaneously.

According to a second aspect of the disclosure, there is provided an electronic point of sale system comprising a cash drawer according to the fourth aspect.

According to a third aspect of the disclosure, there is provided a method for determining the change in the contents of a cash tray, comprising: determining an occurrence of one or more cash token events occurring in a transaction of a point of sale system, each event comprising the addition or removal of one or more cash tokens from the cash tray; for each cash token event, determining the weight change of the cash tray for the event and a location on the cash tray of the event; determining the total change in weight of the cash tray in the transaction; based on one or more of: the weight change for each event; the location for each event; and the total weight change of the cash tray, generating a plurality of possible transaction combinations of cash tokens added and/or removed from the cash tray in the transaction, each transaction combination having an associated transaction combination probability.

The method may comprise: measuring at least a first force signal and a second force signal, the first force signal representative of the force exerted by the cash tray at a first location, and the second force signal representative of the force exerted by the cash tray at a second location; and analyzing the first and second force signals to determine the occurrence of one or more cash token events, the weight and location of the cash tokens added or removed in each cash token event, and the total weight change of the cash tray.

The method may comprise: dividing the force signals measured in the transaction into event windows, each event window comprising a sub-section of the transaction in which one cash token event occurs.

Dividing the force signals into event windows may comprise: dividing the measured force signals into sub-windows: determining if the measured force signal in each sub-window is constant or non-constant; and defining an event window as one or more consecutive non-constant sub-windows, with constant periods of one or more constant sub-windows before and after the consecutive non-constant sub-windows.

A sub-window may be determined to be constant or non-constant based on one or more of: the average signal change; and the range of signal measured.

A sub-window may be determined to be constant if the average measured signal and/or range of the measured is below a stability threshold.

A non-constant sub-window may be determined to be an event sub-window if the average measured signal and/or range of the measured signal is above an event threshold, and a noise sub-window otherwise.

The method may comprise: determining the change in weight of the cash tray, over an event or over the transaction, based on a change in average magnitude of the forces represented by the first and second force signals.

The method may comprise: determining the location of the measured force of an event based on the relative changes of the average magnitude of the forces represented by the first and second force signals.

Determining the weight and location of the cash tokens added or removed for a cash token event may comprise: generating an event combination probability for each of a plurality of possible event combinations of cash tokens added and/or removed from the cash tray, the event combination probability an event combination being the probability that it is the correct combination.

The event combination probability may be determined based on one or more of: the probability that the event combination is the correct combination based on the change in weight of the cash tray over the event; and the probability that the event combination is the correct combination based on the location determined for the event.

The transaction combinations may be determined from all possible combinations of the event combinations for all the events occurring in the transaction.

The transaction combination probability for each transaction combination may be based on one or more of: the event combination probabilities; and a weight change probability based the weight change measured over the transaction.

The method may comprise for each possible transaction combination, determining an expected weight change of the cash tray over the transaction; comparing the expected weight change with the measured weight change; and based on the comparison, determining the weight change probability that each combination is correct.

The method may comprise: for each possible event combination, determining an expected weight change of the cash tray; comparing the expected weight change with the measured weight change of the cash tray; and based on the comparison, determining a first probability that each combination is correct.

Determining the first probability may comprise: comparing the difference between the expected weight and the measured weight with a statistical distribution of the variation in the measured weight of real cash tokens from the expected value.

The method may comprise for each possible event combination, determining an expected force position in the cash tray; comparing the expected position with the measured position; and based on the comparison, determining a second probability that each combination is correct.

Determining the second probability may comprise: comparing the difference between the expected position and the measured position with a statistical distribution of the variation in the measured position of real cash tokens inserted in the cash tray.

The location of the cash tray event may be an average position of the cash tray event.

The method may comprise identifying the transaction combination with the highest probability as the change in the contents of the cash tray.

The transaction may comprise a cash transaction at a point of sale system, occurring over a first period of time.

According to a fourth aspect of the disclosure, there is provided a method for tracking the contents of a cash tray comprising: receiving a known starting contents of the cash tray, and storing the known starting contents as the cash tray contents; for each transaction involving the cash tray, determining the change in contents of the cash tray, according to the method of the third aspect, and by identifying the transaction combination with the highest probability as the change in the contents of the cash tray; and after each transaction, altering the stored cash tray contents based on the determined change in contents of the cash tray.

According to a fifth aspect of the disclosure, there is provided an point of sale system comprising: a cash drawer having: a cash tray comprising a plurality of containers, each container for holding a plurality of cash tokens, and two or more force measuring devices arranged to measure the force exerted by the cash tray; and a controller arranged to perform the method of the first or second aspect.

The electronic point of sale system of the second aspect may comprise a controller arranged to perform the method of any the third and fourth aspects.

BRIEF DESCRIPTION OF THE DRAWINGS

There now follows, by way of example only, a description of implementations of the disclosure, described with reference to the accompanying drawings, in which.

DETAILED DESCRIPTION

Figure 1:
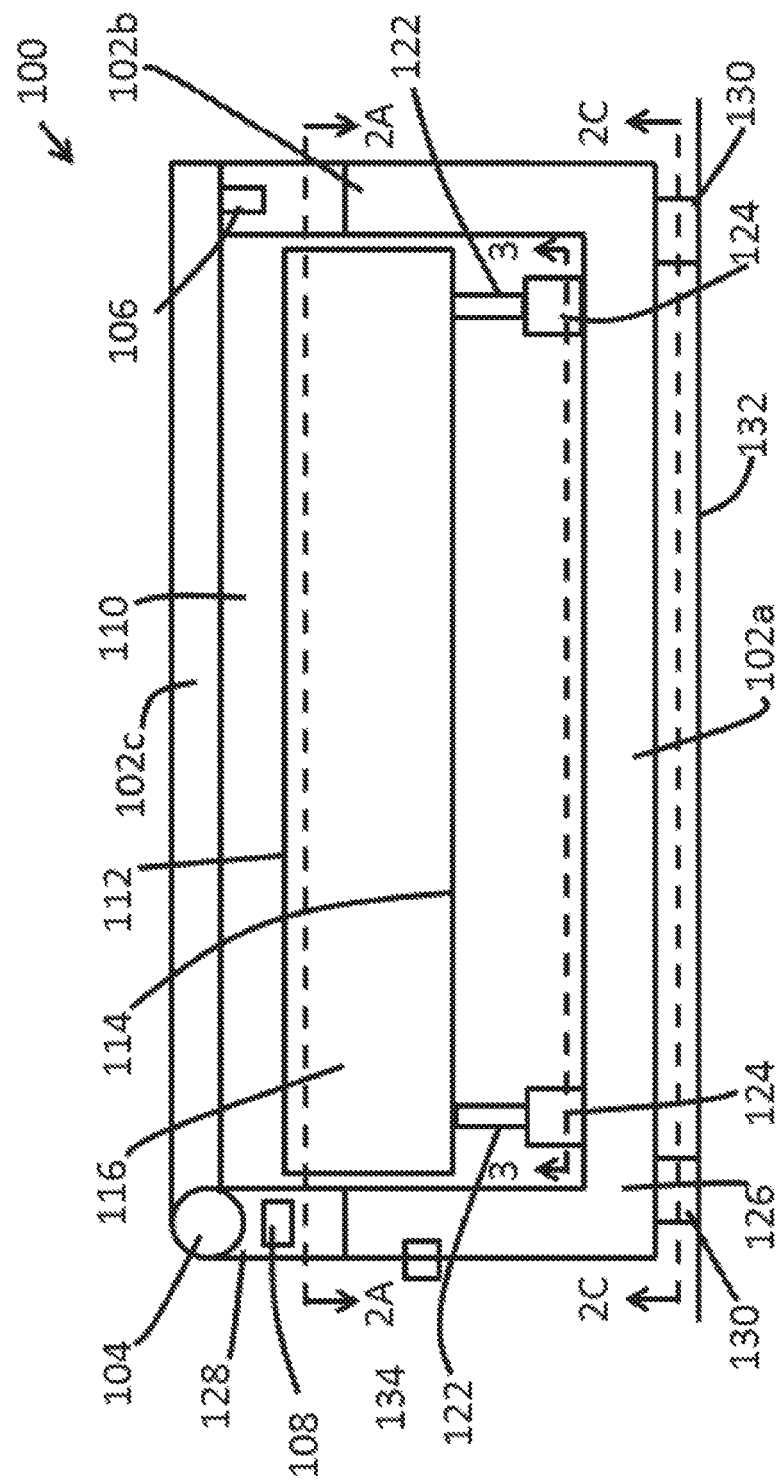
FIG. 1 illustrates a cross-section view of a cash drawer.

FIG. 1 shows an example of a cash drawer 100. The cash drawer 100 is part of a Point of Sale (PoS) system 500 (see FIG. 5), sometimes referred to as an Electronic Point of Sale (EPoS) system or a cash register. The PoS system 500 is used in retail environments to process transactions and cash payments, and the cash drawer 100 is used for storing cash tokens that are received in payment, and that can also be used to make change.

The cash tokens may include one or more of coins; notes; vouchers; and other suitable currency. The PoS system 500 may also be configured to accept payment by credit card, debit card and the like.

The cash drawer 100 comprises a housing 102. The housing includes a bottom wall 102a, side walls 102b, and a lid 102c, defining an internal volume 110. The lid 102c is connected to the sidewalls 102b by a hinge 104, about which the lid 102c can pivot between a closed position (as shown in FIG. 1), in which the internal volume 110 is closed by the lid 102c, such that it is not accessible, and an open position, where the internal volume 110 is accessible, and cash tokens can be added to and/or removed from the drawer.

The lid 102c is biased to the open position, with a latching mechanism 106 provided to hold the lid 102c in the closed position, against the biasing. The biasing may be achieved by the hinge 104, or a separate biasing member such as a spring (not shown). A release mechanism 108 is provided to allow automatic opening of the lid 102c to be triggered. The release mechanism 108 may also allow for automatic closing of the lid 102c.

Within the internal volume 110, a cash tray 112 is provided. The cash tray 112 holds a plurality of cash tokens, and is formed from a base 114 and side walls 116, with an open top to allow tokens to be added or removed. The cash tray 112 is mounted on force measuring devices 124 by kinematic mounts 122. The force measuring devices 124 are provided on the bottom wall 102a of the housing 102.

The cash drawer 100 also includes a communications interface 134, which allows signals to be passed to/from the force sensing devices 112, latching mechanism 106, and release mechanism 108. The communications may be any suitable wired (for example, USB, serial, LAN) or wireless (for example Bluetooth, WIFI) interface.

The housing 102 is formed from a base section 126, and a top section 128. The base section 126 includes the bottom wall 102a and a portion of the side walls 102b, giving the base section 126 the appearance of a raised lip around the edge. The base section 126 also includes feet 130, which rest on a flat surface 132. The top section 128 includes the remainder of the sidewalls 102b, and the lid 102c. The base section 126 and the top section 128 can be joined by any suitable means (for example welding, screwing and the like).

The volume defined by the base section 126 includes the force sensing devices 124, and at least a portion of the kinematic mounts 122, and possibly the cash tray 112.

Figure 2A:
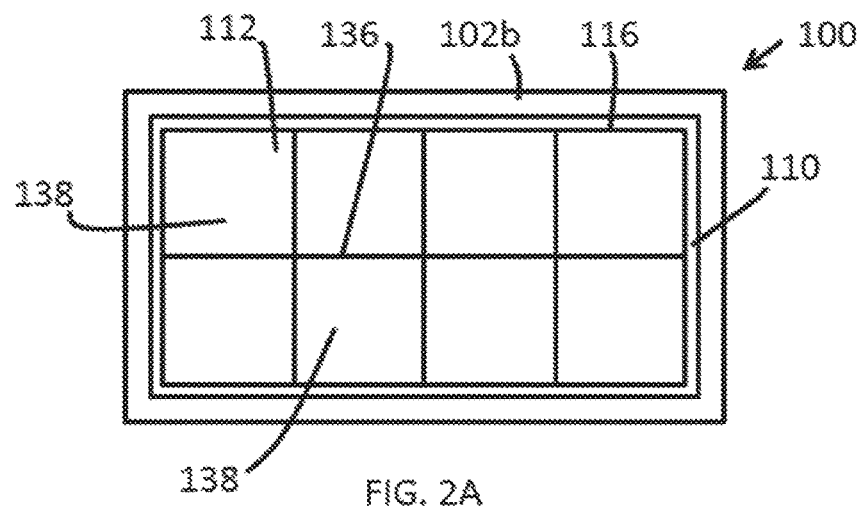
FIG. 2A illustrates a plan view of the cash drawer of FIG. 1, through line 2A-2A.

FIG. 2A shows a cut-through plan view, looking down on the cash drawer at line 2A in FIG. 1 (at the cash tray 112 level).

The cash tray 112 includes internal dividing walls 136 that split the cash tray 112 into eight equally sized square compartments 138 arranged in a four-by-two array. Each compartment 138 is associated with a different type and denomination of cash token. This may be suitable for, for example, eight different denomination coins.

The cash tray 112 has sufficient rigidity that it does not flex when it holds cash tokens, or when cash tokens are added and removed. Accordingly, the required rigidity is, in part, dependent on the maximum capacity of the cash tray 112, and the weight of the cash tokens used. For example, a cash tray 112 used for coins should have greater rigidity than a cash tray used for notes.

The cash tray 112 can be made of any suitable material. In one example, the cash tray 112 is made of plastics, and made by injection moulding or any other suitable technique. For example, the cash tray 112 may be made out of high-density polyethylene (HDPE) or acrylonitrile butadiene styrene (ABS), but other plastics may be used. In other examples, the cash tray may be made from metal, such as aluminium, and formed by machining a piece of metal to form the compartments 138, or any suitable technique.

Figure 2B:
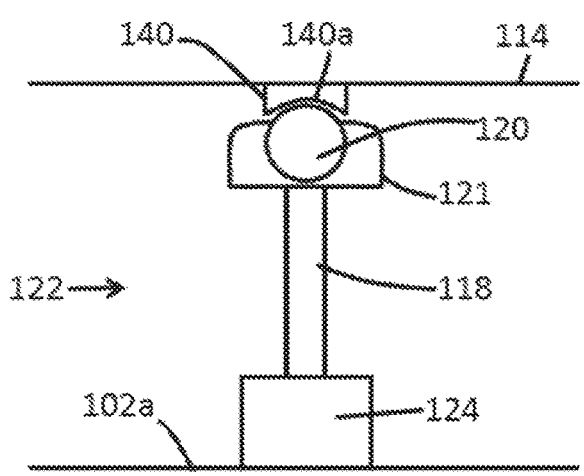
FIG. 2B illustrates a plan view of the cash drawer of FIG. 1, through line 2B-2B.

FIG. 2B shows a cut-through view of how the cash tray 112 is mounted in the force sensing devices 124 in more detail. FIG. 2B shows a single kinematic mount 122, for exemplary purposes. As will be discussed below, there may be a number of different kinematic mounts 122.

The kinematic mount 122 includes a strut 118 or support extending upwardly from the forces sensing device 124. A ball bearing 120, or spherical member is provided within a housing 121 fixed at the top of the strut 118. The housing 121 encases the ball bearing 120, and has an aperture in the top. The depth of the housing 121 is such that a portion of the ball bearing 120 projects through the aperture in the housing. However, the diameter of the aperture is smaller than the diameter of the ball bearing 120, such that the ball bearing 120 is retained. In this way, the ball bearing 120 is mounted such that it is free to rotate about any axis.

A receiving member 140 is provided on the underside of the cash tray base 114, a groove or channel 140a is provided in the receiving member 140, and the ball bearing 120 is received in the channel 140a.

The channel 140a is elliptical or rectangular, with curved ends, such that the ball bearing 120 can slide along the channel 140a, while still maintaining contact with the cash tray 112, so the cash tray 112 continues to exert a downward force on the force sensing devices.

The mount has two degrees of freedom—the ball bearing 120 can slide along the channel 140a, or the cash tray 112 can be lifted off the ball bearing 120. The direction of the channel 140a, and hence where the ball bearing 120 can slide is dependent on a number of factors, including the total number of force sensing devices 124, and this will be discussed in more detail below.

A protective cover (not shown) may be provided over the forces sensing device 124, to house and protect the force sensing device 124. The cover includes an aperture through which the strut 118 passes. In some examples, a single cover may extend over the whole housing base 102a, and cover all of the force sensing device 124. In another example, each force sensing device 124 may have a separate cover.

The strut 118 may be fixed to force sensing device 124, and the receiving member 140 may be fixed to the cash tray 112 in any suitable manner. Furthermore, the housing 121 may be fixed to strut 118 in any suitable manner.

The force measuring devices 124 may be any suitable device. In one example, the force measuring devices 124 are load cells.

The struts 118, ball bearing 120, housing 121 and receiving member 140 may be made from any suitable materials. In one example, all the components are aluminium, although any suitable metal or plastic may be used to provide the required strength, and the components may not necessarily be of the same material.

Although the channel 140a discussed above is elliptical or rectangular with round ends, it will be appreciated that any shape channel may be used. Furthermore, the channel shown has a hemispherical cross section, however, any suitable shape cross section may be used. In one example, the channel 140a may be formed by a pair of rods, spaced from each other to form the channel 140a between the rods.

Any suitable rotating or sliding member may be used in the channel 140a.

Each of the kinematic mounts 122 has at least one degree of freedom along which it can translate. The use of the kinematic mounts 122 means that a downward force exerted on the cash tray 112 towards the force measuring devices 124 is translated into a sliding movement of one or more of the ball bearings 120 in the channels 140a. This stops the cash tray 112 deflecting in any direction, and there is no translation of the cash tray relative to the base in the horizontal plane. In other words a fixed point on the cash tray 112 does not move in the horizontal plane, with respect to the position of the force measuring devices.

For a force applied unevenly with respect to the force measuring devices (e.g. in a corner of the cash tray 112, each kinematic mount 122 will translate by a different amount. The different amount of translation from vertical, and the different distance of the mounts 122 from the force means that each force sensing device 124 will measure a different force. For a force applied evenly, each mount 112 will deflect by the same amount.

In at least some implementations, the deflection of the mounts 122 reduces mechanical cross-talk, which can reduce the accuracy of measurements. Mechanical cross-talk occurs when a force exerted on the cash tray 112 is transferred to multiple force sensing devices 124, because rigid connections between the cash tray 112 and force measuring devices 124. Kinematic mounts 122 mean the deflection is accommodated elsewhere in the system (by movement of the mounts 122), and the force measurements are close to a true measurement of the force exerted. This means that at least some implementations allow for accurate determination of the location and weight of cash tokens added to or removed from the drawer as a cash transaction is occurring.

The example mount 122 discussed above is by way of example only. It will be appreciated that any other type of kinematic mount, which allows for deflection of the mount 122, reducing cross-talk between force sensing devices 124 may be used.

Figure 2C:
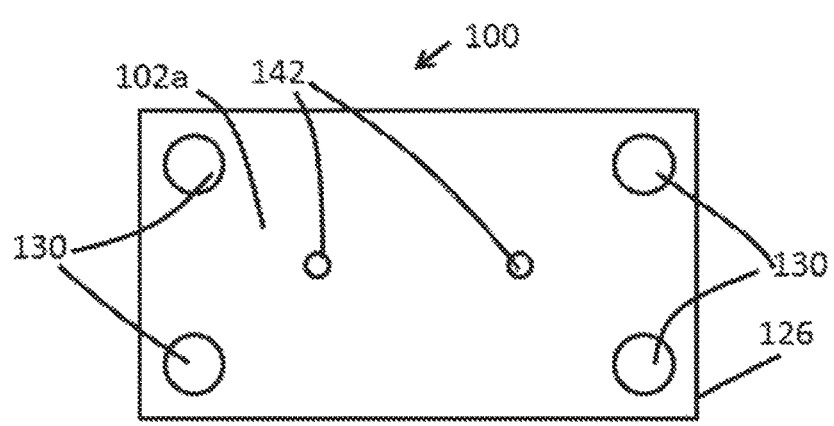
FIG. 2C illustrates a plan view of the cash drawer of FIG. 1, through line 2B-2B.

FIG. 2C shows a cut-through plan view, looking up on the cash drawer at line 2B in FIG. 1 (at the bottom wall 112a level). The base section 126 rests on four feet 130 provided near the corners of the bottom wall 102a. Bolts 142 are provided to secure the base 126 to the flat surface 132. The bolts 142 are secured so that the feet 130 are compressed and the cash drawer 100 held level and securely to the surface 132. The surface 132 must be flat and stable, and the base wall 102a rigid, to ensure that vibrations are not passed through the base 102a, to the force measuring devices 124. This could add noise to the signals measured, and in some cases cause false readings, if the noise signal is sufficient.

The base section 126 and top section 128 can be made of any suitable material, such as mild steel, or any other metal. Similarly, the feet 130 may be made of any suitable material, such as rubber, to absorb any shock. It will also be appreciated that any suitable fixing 142 may be used, instead of bolts.

Figure 3A:
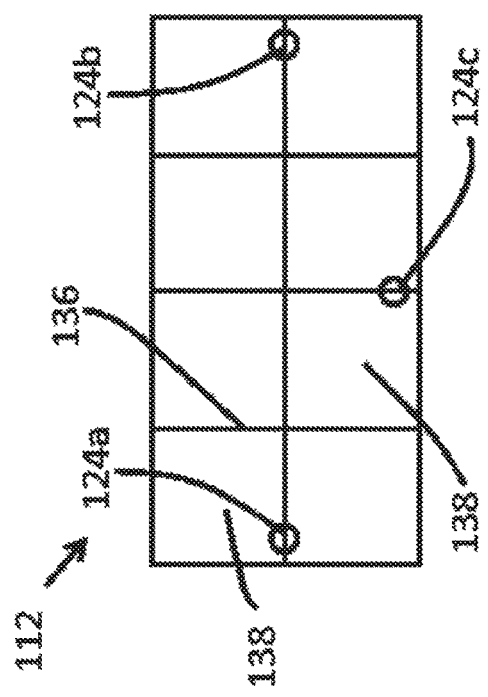
FIG. 3A illustrates a first example of a cash tray and force sensing devices.
Figure 3B:
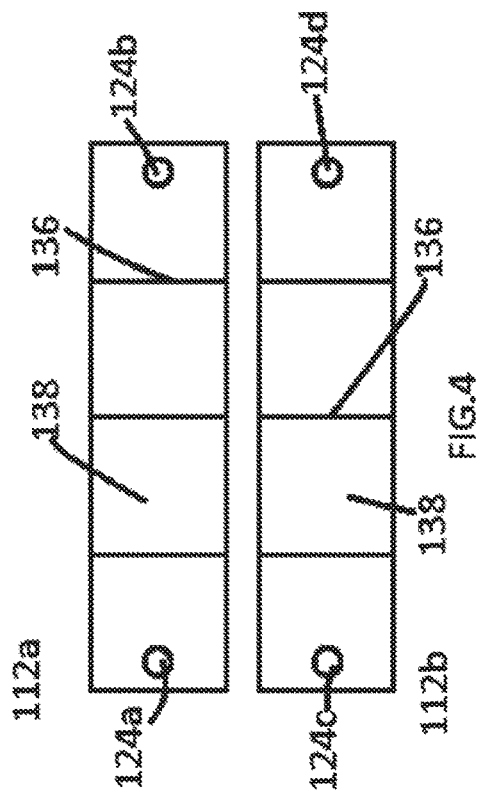
FIG. 3B illustrates the cash tray of FIG. 3A, with an alternative arrangement of force sensing device.
Figure 3C:
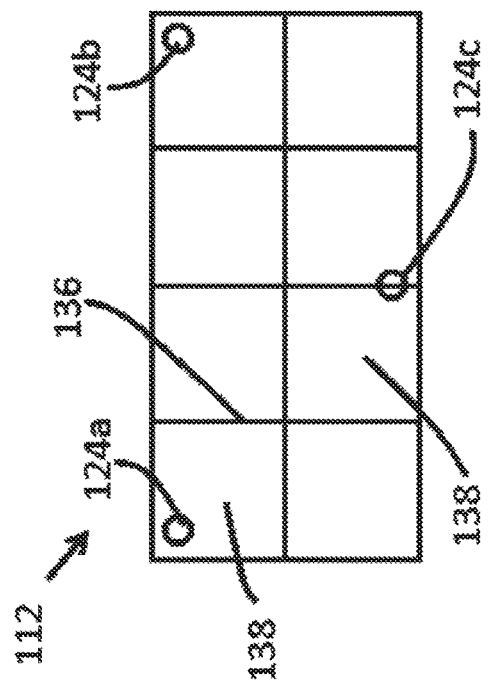
FIG. 3C illustrates the cash tray of FIG. 3A, with a further alternative arrangement of force sensing device.

FIGS. 3A to 3C show a cut-through plan view, looking up on the cash drawer at line 3 in FIG. 1 (at the force sensing device 124 level). FIGS. 3A to 3C show three possible arrangements of force sensing devices 124 for the four-by-two array cash tray 112 shown in FIG. 2A. In each example, three force sensing device 124a, 124b, 124c are provided.

With three force sensing devices 124, the channel 140a of the receiving member 140 for each kinematic mount 122 is aligned in the direction bisecting the angle at each vertex of a triangle formed by lines joining the force sensing devices 124.

In all three examples, a first force sensing device 124a, and a second force sensing device 124b are provided in mirroring positions at or near the short edges of the cash tray 112a.

In the example, shown in FIG. 3A, the first force sensing device 124a and the second force sensing device 124b are provided at opposite ends of a first long side of the cash tray 112a, at the corners with the opposite short edges. The third force sensing device 124c, is provided mid-way along the second long edge.

In the example, shown in FIG. 3B, the first force sensing device 124a and the second force sensing device 124b are provided mid-way along the opposite short edges. The third force sensing device 124c, is provided mid-way along one of the long edges.

In the example, shown in FIG. 3C, the first force sensing device 124a and the second force sensing device 124b are provided at opposite ends of a first long side of the cash tray 112a, at the corners with the opposition short edges. The third force sensing device 124c, is provided at an opposite end of one of the short edges to the second force sensing device 124b.

In FIGS. 3A to 3C, the force sensing devices 124 are provided at the edges of the cash tray. It will be appreciated, that they may be spaced in from the edges to account for properly mounting the force sensing devices 124 within the volume 110, and to ensure that the cash tray 112 sits fully and evenly on each force sensing device 124.

The cash tray 112 may be removable from the cash drawer 100. A handle (not shown) may be provided to help this. The handle may be detachable, or may be pivoted into a position where it is stowed in the cash drawer 100, when not needed. Removal of the cash tray 112 may include disconnection of the mounts 122, if necessary, or lifting the cash tray 112 off the mounts 122.

Figure 4:
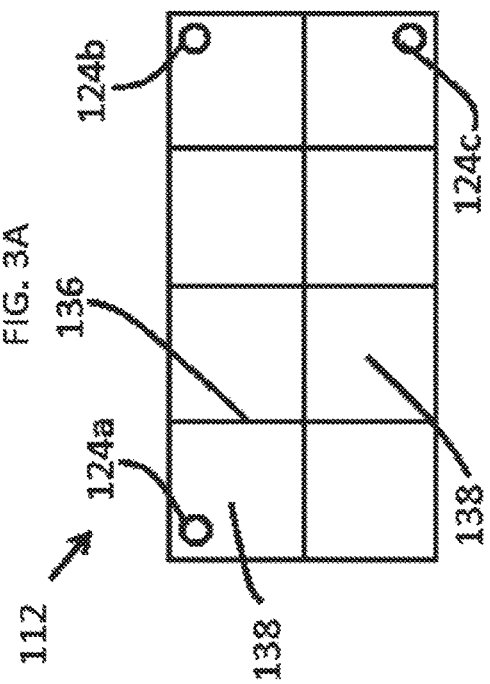
FIG. 4 illustrates an example of two cash trays and force sensing devices.

FIG. 4 shows an alternative arrangement for the cash drawer 100, although the principle is the same as the examples shown in FIGS. 3A to 3B. In this example, the cash drawer comprises a first cash tray 112a and a second cash tray 112b. Each cash tray 112a, 112b is split into four square compartments 138 in a four-by-one array.

In the example shown in FIG. 4, two force sensing devices 124 are associated with each cash tray 112a, 112b. In this example, the channel 140a of one of the receiving members 140 is aligned parallel to the long side of the cash tray 112a, and the channel 140a of the other receiving member 140 is aligned perpendicular long side of the cash tray 112a.

A first force sensor 124a is provided mid-way along a first short edge of the first cash tray 112a. As with the example in FIGS. 3A, 3B and 3C, the second force sensing device 112b is provided in a mirror position along the other short edge. A third force sensing device 124c and fourth force sensing device 124d are arranged in a similar manner around the second cash tray 112b.

In an alternative example of the cash drawer 100 including two cash trays 112 with the four-by-one arrangement, the four force sensing devices 124a-d may be provided at the four corners of the rectangle formed by the pair of cash trays 112. The alignment of the channels 140a is the same as in the previous example with two cash trays 112 and four force sensing devices 124a-d.

Each cash tray 112a, 112b may be removable from the cash drawer separately, as discussed above. However, it will also be appreciated that the cash trays 112a, 112b may include connecting mechanisms that allow the cash trays 112a, 112b to be connected to each other and removed together. Part of, or all of, the connecting mechanism may be included in the handle. The cash trays 112a, 112b should be disconnected during normal use, so that deflection of the first cash tray 112a by a first force does not cause deflection of the second cash tray 112b.

In the examples, shown, the cash tray 112 has four compartments 138 or eight compartments 138. However, in some examples, the cash tray 112 may have any number of compartments 138. For example, the cash tray 112 may have two or three, compartments 138, or five, six or seven compartments 138, or more than eight.

It will also be appreciated that the cash drawer 100 can include any number of different cash trays 112, each of any shape and arrangement (i.e. any number of rows and columns of compartments 138), each cash tray 112 provided with its own set of force measuring devices 124.

From the examples discussed with reference to FIGS. 3A to 3C and 4, it will be appreciated that for a cash tray 112 with a single row of compartments 138 and multiple columns (or a single column and multiple rows), two force measuring devices 124 are required, and for a cash tray 112 with multiple rows and columns, three force measuring devices 124 are required. However, it will be appreciated that in both case, further force sensing devices 124 can be provided. These can be positioned at the edges of the cash tray 112, or towards the centre.

In addition, although the kinematic mounts 122 described above have one degree of translational freedom along the channel 140a, it will be appreciated that further degrees of translational freedom can be provided, if necessary, by allowing for translation in different directions. Furthermore, in some examples, different force sensing devices 124 may be coupled to the cash tray 112 by kinematic mounts with different degrees of freedom.

It will also be appreciated that the compartments 138 in the cash tray 112 do not have to be square or evenly sized, and compartments 138 may be provided of different sizes and shapes.

In the example shown, the cash tray 112, is removable, However, in other examples, the cash tray 112 may be fixed to the mounts 122. In one example, the fixing to the mounts may be through shaping the channel 140a to help retain the cash tray 112, removing the lifting degree of freedom.

In the example shown, the ball bearing 120 is coupled to the force sensing device 124, and the channel 140a is coupled to the cash tray 112. It will be appreciated that this arrangement can be inverted, so that the channel 140a is coupled to the force sensing device 124, and the ball bearing 120 to the cash tray 112.

In the example shown, the base section 126 includes the base wall 102a, and part of all four of the side walls 102b, and the top section 124 includes part of the side walls 102b, and the lid 102c. It will be appreciated that this arrangement is by way of example only, and any suitable arrangement may be used. For example, the base section 126 may include the whole height of the side walls 102b, or none of the side walls 102b. Alternatively, the base section may include part or all of the height of some of the side walls 102b. In another example, the housing 102 may be made of a single unit.

In the example shown, four feet 130 are provided at the corners of the base wall 102a, with bolts 142 provided towards the centre of the base wall 102a. It will be appreciated, that any suitable number of feet 130 may be provided in any position, and any suitable number of bolts 142 may be provided, in any position. In some examples, the feet 130 and bolts 142 may be co-located, so that the bolts 142 pass through the feet 130.

Furthermore, although the lid 102c of the cash drawer 100 has been described as biased to the open position, the lid 102c may be biased to the closed position, or not biased at all.

In some examples, the cash drawer 100 may include an additional cradle (not shown). The cash tray 112 may rest on the cradle on supports, and the force sensing devices may be coupled to the cradle by the kinematic mounts 122.

It will be appreciated that the construction of the cash drawer 100 given above is by way of example only. Any suitable construction of cash drawer 100 may be used. In one example, the cash drawer 100 may slide in and out of an aperture at the front of the housing 102, to allow access to the cash tray 112, rather than allowing access through a lid 102c.

Figure 5:
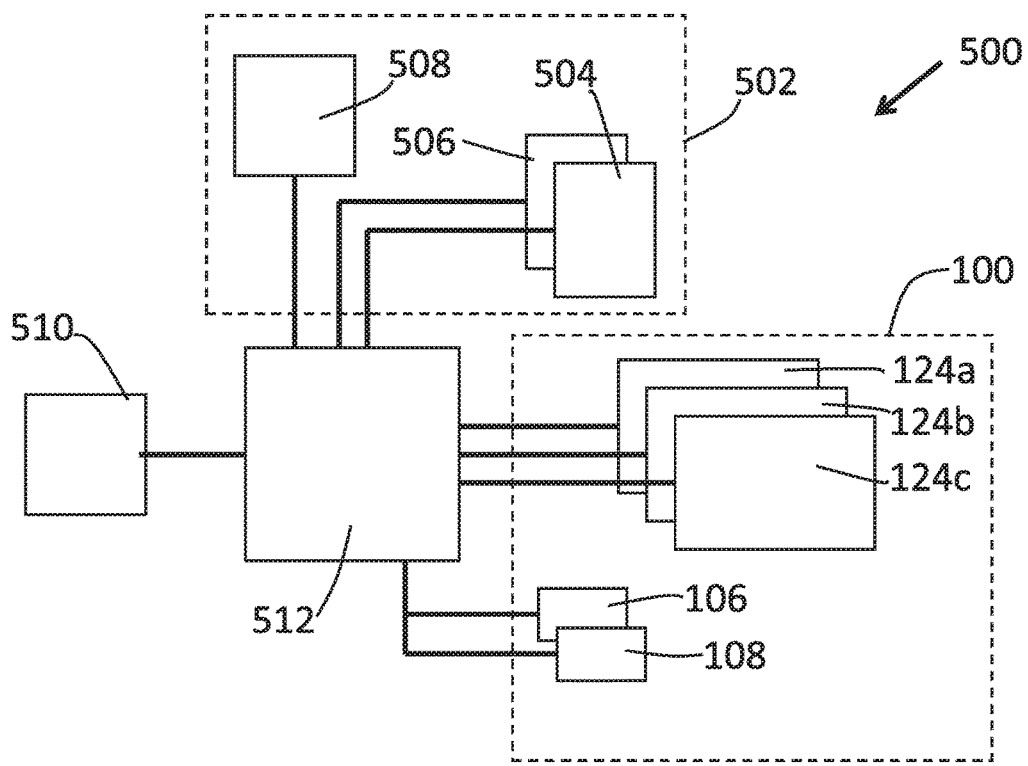
FIG. 5 illustrates a schematic example of an electronic point of sale system.

FIG. 5 shows a schematic illustration an example of a PoS system 500 incorporating the cash drawer 100 of FIG. 1. FIG. 5 only shows selected components of the PoS system 500 and their inter-relationships, and does not show the full physical structure of the system.

In addition to the cash drawer 100, the PoS system includes an input/output subsystem 502, and a communication subsystem 510.

The input/output subsystem 502 may include input means to allow information about a transaction (e.g. value of goods, money tendered) to be entered into the PoS system 502, and output means to provide information about the transition (e.g. total amount due, change due) to an operator and/or a customer.

The input means may include a keyboard or keypad 504, and a bar code reader 508. The output means may include a display 508. The display 508 may include a portion arranged to face an operator of the PoS system, and a portion arranged to face a customer, or separate displays.

The communications subsystem 510 may include any suitable form of communications interface. For example, the communications sub-system may include one or more of wired or wireless (such as short-range radio, long-range radio, WIFI, blue tooth) connections. The communications subsystem 510 may connect to a local network and/or the internet and/or a private network.

Through the communications subsystem 510, the PoS system 500 may be connected to a central control system or database (not shown). The central control system may collect information from multiple PoS systems 500. For example, the central system may collect information from a plurality of PoS systems operating in one or more stores operated by a retailer.

Where the PoS system 500 is also able to accept payment by debit or credit card, the input/output subsystem 502 may also include a card reader (not shown), and the communications, and the communications subsystem may be arranged to allow the PoS system to perform the necessary authentication procedures.

The PoS system 500 also includes a controller 512. The controller 512 controls the operation of the PoS system 500, and the communication through the communication subsystem 510. The controller 512 receives and analyses the signals from the force measuring devices 124 (discussed in more detail below), receives and processes inputs from the input/output subsystem 502, controls the operation of the display(s) 508, and controls the automatic opening of the cash drawer 100.

The controller 512 may also include a memory 514, although it will be appreciated that the memory 514 may be provided separately. The memory 514 can store instructions to control the operation of the PoS system 500 and details of transactions involving the PoS system 500, and details on the contents of the cash drawer 100.

All of the different parts of the PoS system 500 may be provided in a single unit. Alternatively, the parts may be provided across two or more several different units. Where the cash drawer 100 is provided remotely from the controller 512, the connections to the force sensing devices 124, the latching mechanism 106 and the release mechanism 108 may be provided through any suitable means, via the communications interface 134 of the cash drawer 100. This may be included in, or separate to, the communications subsystem 510 of the PoS system 500.

By analysing of the signals measured by the force sensing devices 124, the contents of the cash drawer 100 can be tracked during the working time of the cash drawer 100. This is dynamic in the sense that it is a "live" update of what is in the cash drawer 100 at any given time, and is achieved by determining of the value of each individual cash token added to/removed from the cash drawer 100, and the change in the contents from an individual transaction.

The controller 512 receives the signals from the force sensing devices 124, and converts them to force measurements, the converted signals are then analysed by the controller 512.

A method for determining the contents of a cash drawer 100 will be discussed in more detail below, with reference to FIGS. 6 to 8. In the below description, a transaction is considered to be the tendering of one or more cash tokens in payment, and, if necessary, the provision of one or more cash tokens as change.

In the example discussed below, the force sensing devices 124 are arranged in the manner shown in FIG. 3A, FIG. 3B, or FIG. 3C.

Figure 6:
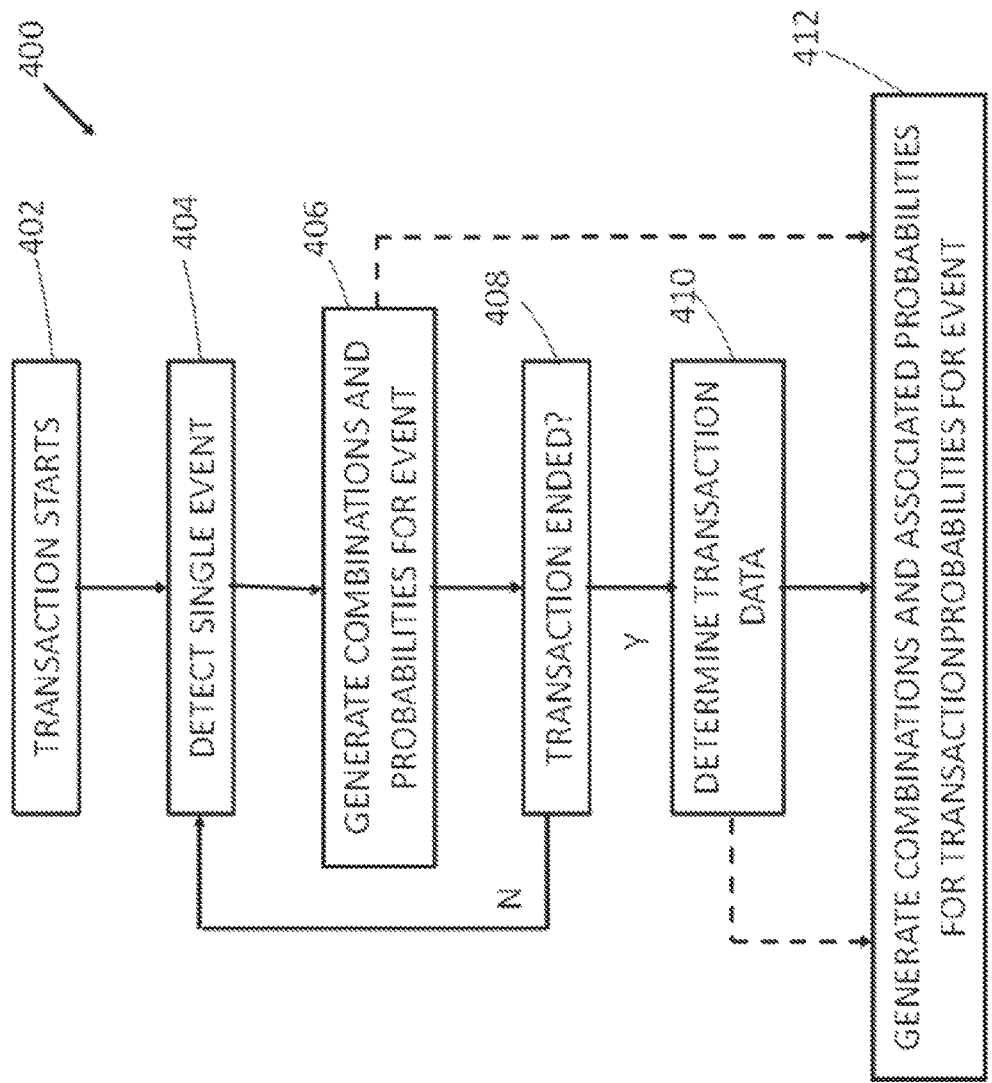
FIG. 6 illustrates a method of determining the change in the contents of a cash tray.

FIG. 6 generally illustrates a method 400 for determining the change in the content of the cash drawer 100 for a single transaction. The method 400 starts when the transaction is started 402. The start of a transaction may be determined by any suitable trigger. The trigger may be, for example, the scanning of a first item, an operator input, the drawer 100 opening and the like.

After the transaction has been started, the cash drawer 100 is opened and the operator starts placing cash tokens into the cash tray 112 as payment. The operator may also remove cash tokens to make change. The addition or removal of each cash token, or multiple cash tokens at the same time, is considered to be a single cash token event.

At a second step, whilst the drawer 100 is open, an individual cash token event is detected 404. Each event is then analysed 406 to determine any possible cash token or combination of cash tokens that may have resulted in the event ("event combinations"), and the associated probability of each different event combination. The detection and analysis of cash token events is discussed in more detail below.

After each event, a check 408 is made to determine if the transaction is finished. The end of the transaction may be determined in any suitable manner. For example, the transaction may be determined as finished after the cash drawer 100 is shut, after a period where no tokens are added or removed, or after an operator input. If it is determined that the transaction has ended and the cash drawer 100 is not shut, the drawer 100 may be shut automatically.

If the transaction has not finished (N), the method 400 returns to the detection of cash token events 404 and continues as before. If the transaction has finished (Y), then full transaction data is determined 410. The full transaction data will also be discussed in more detail below.

At a final step, the method 400 generates all possible combination of cash tokens 412 that could result in the measured set of events and the full transaction data ("transaction combinations") along with the probability of each transaction combination. The most probable transaction combination is then identified as the change in cash tokens in the cash drawer 100.

Over a working day, shift, or any other period over which the PoS system 500 is operated, there may be any number of transactions. At the start of the period, the contents of the cash drawer 100 are known. After each transaction, the contents of the cash drawer 100 are updated based on the most likely transaction combination from each transaction. In this way, the contents of the cash drawer 100 can be determined at the end of the operation of the drawer 100, and at any point throughout the day.

Figure 7A:
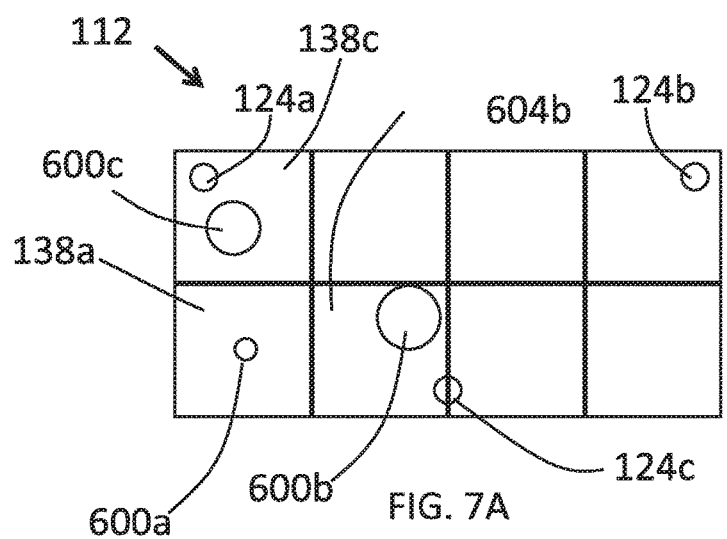
FIG. 7A illustrates an example of a cash tray with three cash tokens added.

FIG. 7A illustrates a cash tray 112, showing an example of:

A first cash token event 606*a*—the addition of a coin 600*a* to a first compartment 138*a*, at the bottom left of the cash tray 112;

A second cash token event 606*b*—the addition of a coin 600*b* to a second compartment 138*b*, at the bottom left centre of the cash tray 112; and A number of third cash token event 606*c*—the addition of a plurality of coins 600*c* to a third compartment 138*c*, at the top left of the cash tray 112.

Each of the events 606 is considered to occur in an event window. An event window is typically 0.5 seconds in length, although this may be more or less. Different event windows may have different length.

Figure 7B:
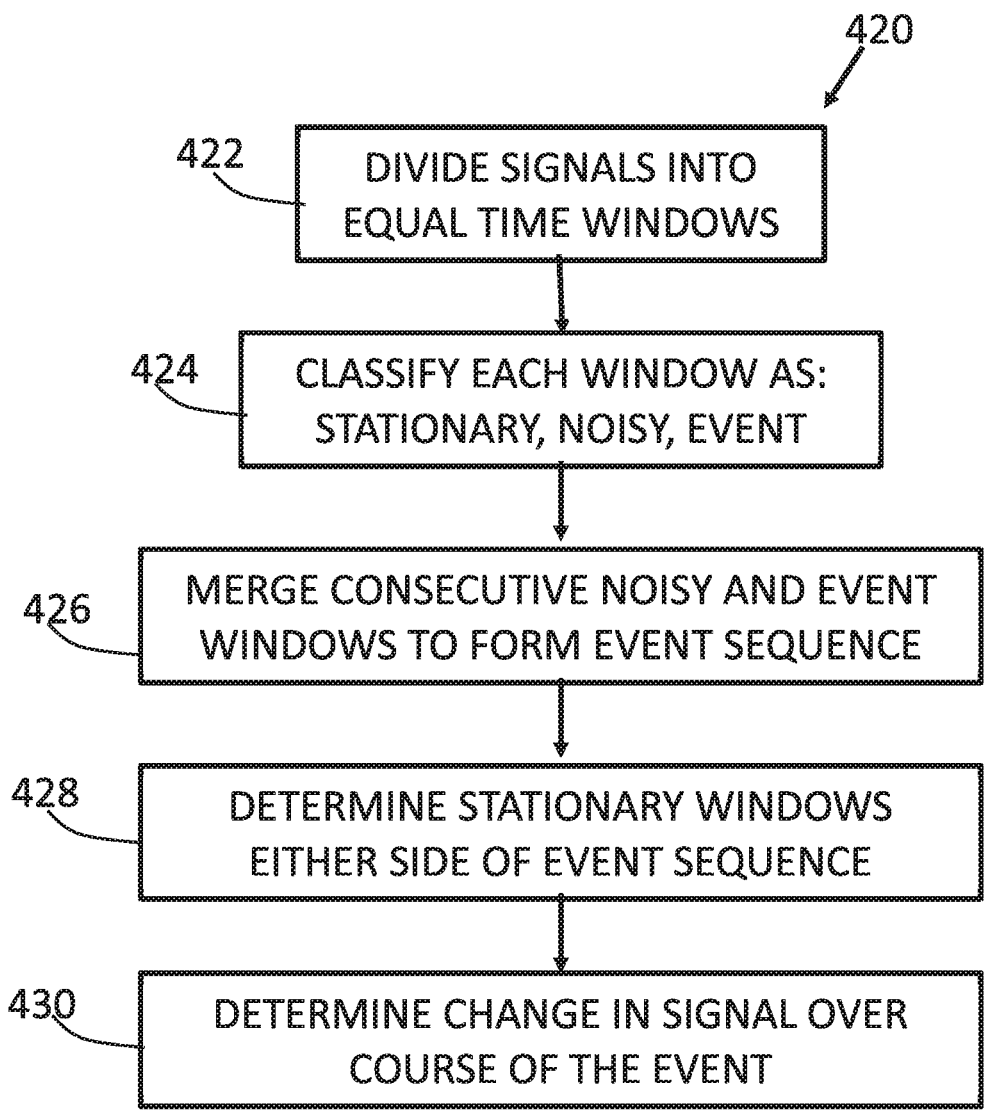
FIG. 7B illustrates a method of analyzing signals from force measuring devices to identify cash token events.

FIG. 7B shows a method 420 of analysing the signals from the force sensing devices 124 to identify the events (the second step 404 of FIG. 6).

The signals from the force sensing devices 124 are divided into separate time sub-windows 422, each of equal length. Each time sub-window may be a 0.5 milliseconds in length, such that each event window is made up of a number of sub-windows. The sub-windows may be any length, but the length should be chosen to given appropriate resolution to the shortest possible duration of an event.

Each time sub-window is classified 422 into one of three categories: stationary/constant, noisy and event. The categorisation is achieved by measuring the range of the signal occurring in the sub-window, and the average change in the signal over the sub-window. In general, a sub-window is considered stationary/constant if the signal change is below a first threshold, noisy if the signal change is above the first threshold and below a second threshold, and event if the signal change is above the second threshold. The first and second thresholds are determined based on the noise currently being measured on the signal. For the method to determine that an event has occurred, there can be any number of consecutive event sub-windows, for example 1 or more consecutive event sub-windows.

The thresholds above are just by way of example only, and are typically determined by a calibration procedure. Each cash tray 112 may be calibrated separately, or the cash tray 112 may include predetermined calibration data.

At a third step 426, the non-constant signals (noise and event) are grouped together to isolate each event 606 in event windows.

As discussed above, an event can include a single cash token, or multiple cash tokens. For separate events to be recognised, they must be separated by one or more constant sub-windows. Therefore, in a fourth step 428, the constant period either side of the groups of noise and event signals are identified.

Figure 7C:
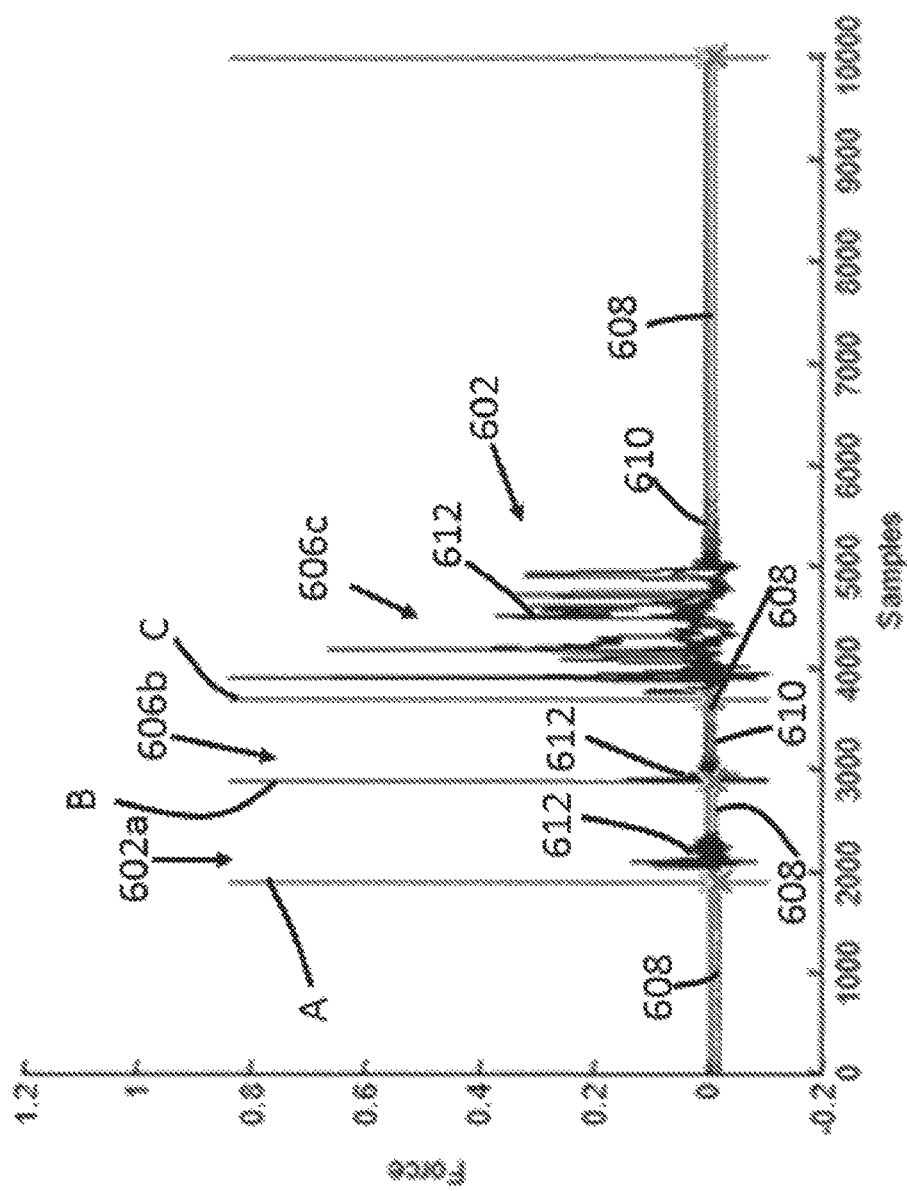
FIG. 7C illustrates an example of signals corresponding to three cash token events.
Figure 7D:
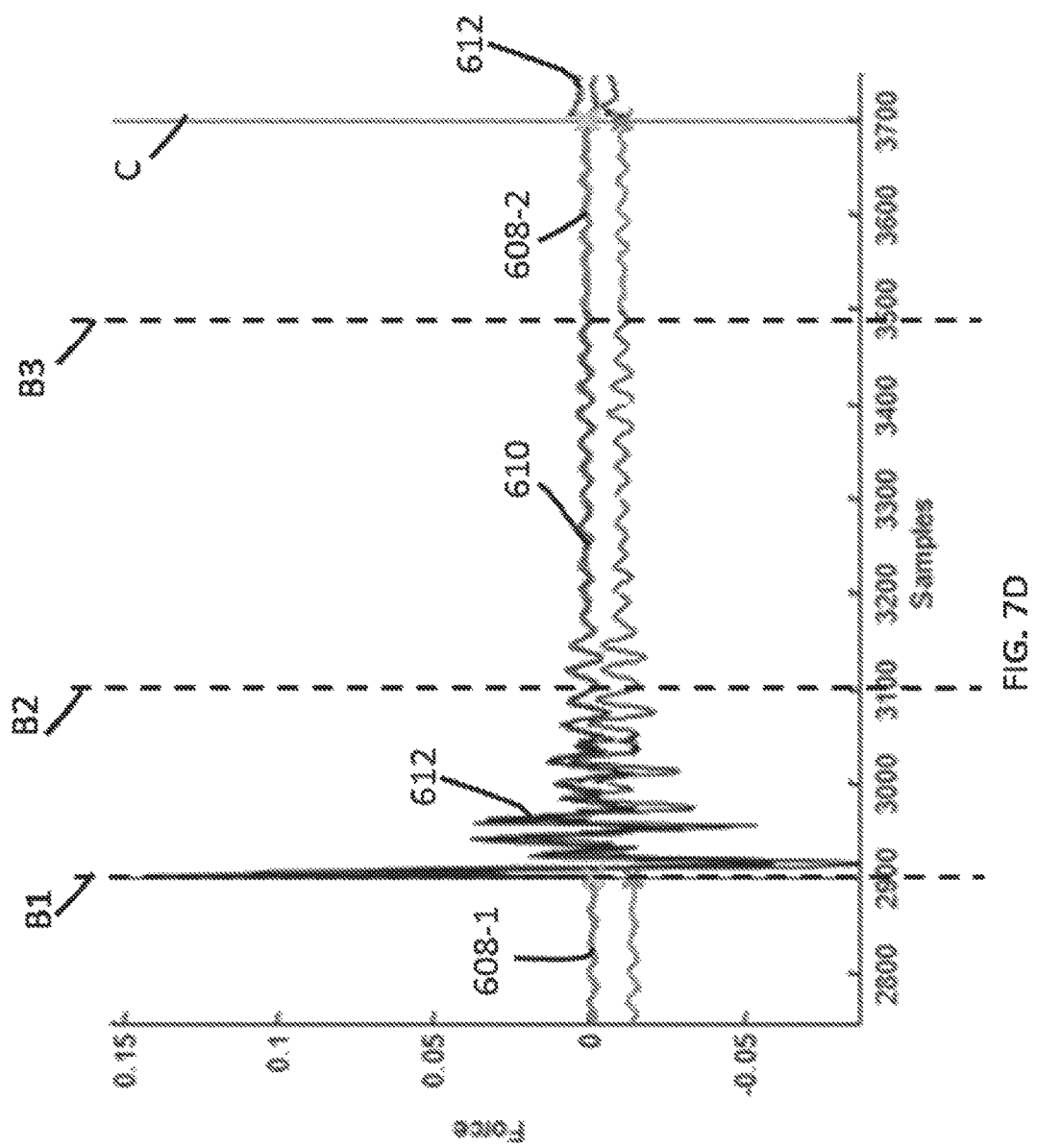
FIG. 7D illustrates the signal of the second cash token event of FIG. 7C.

FIG. 7C shows an example of the signals 602 measured during a transaction including three events 606*a*, 606*b*, 606*c*. Each sample is a time sub-window of the signal. The events are separated by vertical lines A, B, C. FIG. 7D shows the region around the second event 606*b*, and the start of the third event 606*c*. The signals show first regions 608 of constant sub-windows, second regions 610 of noisy sub-windows and third regions 612 of event sub-windows.

In FIG. 7D, the different regions of signal are separated by vertical lines B1, B2, B3. As can be seen, a first constant region 608-1 occurs before the event, and a second constant region 608-2 occurs after the event. The second constant region 608-2 also serves as the constant region before the third event 606*c*.

At a final step 430, the change in the signal 602 from each force sensing device 124 is determined for each event 606. This can done by computing the mean of the constant signal before and after the event 606, and taking the difference. This minimises the impact of any drift in the force sensing devices 124. Gauss-Newton filters can also be used to determine the change in the signal, or any other suitable technique.

From FIGS. 7C and 7D, it will be seen that the signals are relatively complex. It will be appreciated that no two cash token events 606 will result in the same signals, even if the events are, in reality, the same.

The variation may occur for many reasons, for example, two cash tokens of the same value may have different weights (discussed in more detail below), the cash token may bounce, or not land at precisely the same location or completely flat. All of these may causes difference in the signals.

Where there is little or no change in the signal before and after an event, the event may be ignored for all later analysis, or the list of possible combinations may include combinations where the event is ignored. This is because the signal is likely to have been caused by deflection of the force sensing devices 124 by other than addition or removal of a cash token 606, for example a hand touching the cash drawer 100. The level or change required to ignore an event is determined by calibration.

Very short events (for example one sub-window) may also be ignored for all later analysis, or in some possible combinations, to take the possibility of the short event being anomalous into account.

Consecutive events are also compared to determine if the change in signals is a result from a single event, with a constant period in the middle. This may be caused by, for example, the constant signal after the actual event including an operator's hand resting on the drawer 100, and then the operator moving their hand away appearing as a second event. A short gap between two events (for example one sub-window) may also be treated as a single event, for at least some possible combinations.

The number of events determined can provide an estimate of the minimum number of tokens involved in a transaction, as each event involves at least one token.

After determining each event, the signals for each event are then analysed to determine the possible event combinations of cash tokens. Each event combination has an associated probability that it is the correct combination. The method uses statistical models for weight variation and force location variation to determine the probabilities of each combination.

Figure 8:
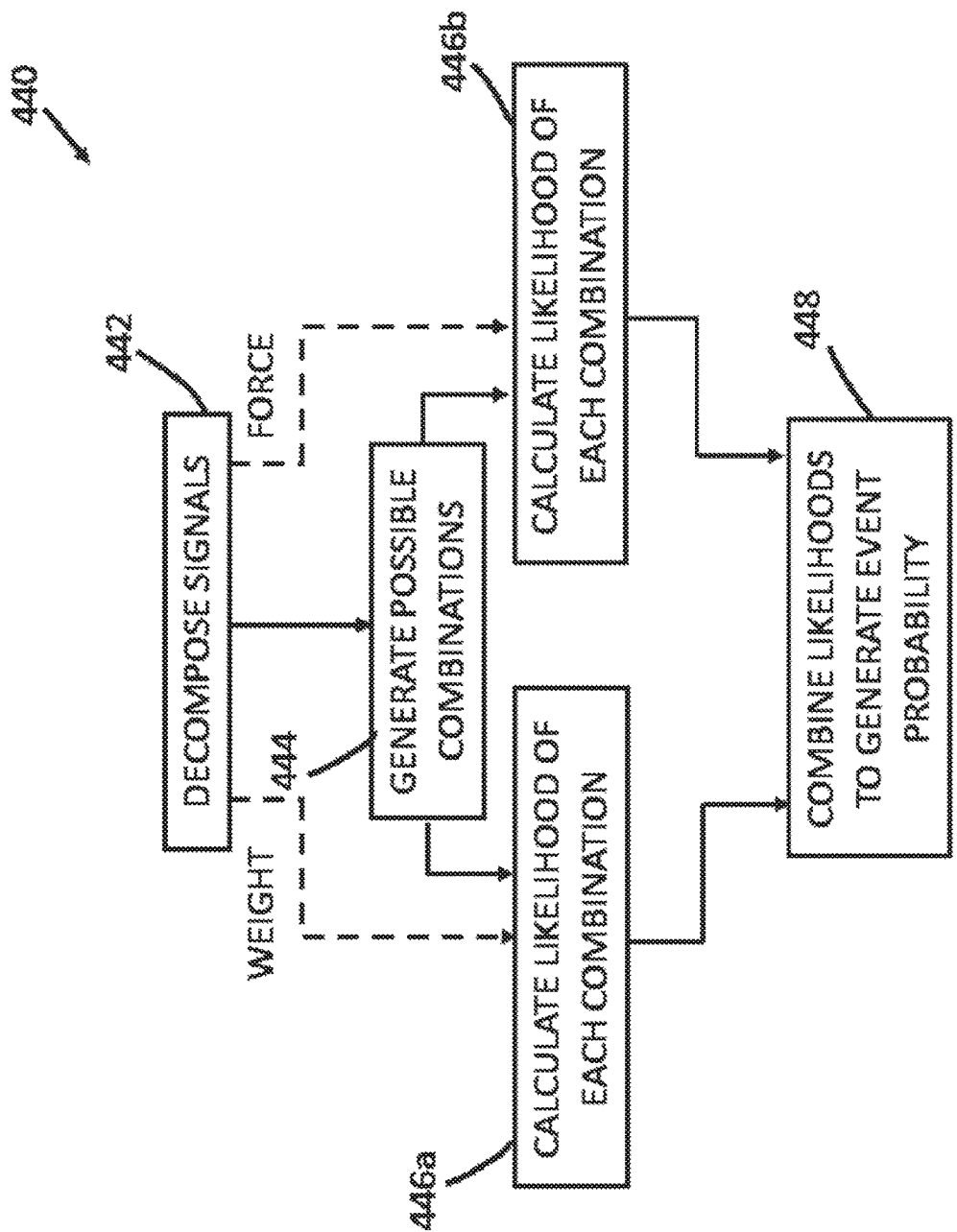
FIG. 8 illustrates a method for generating the combinations and probabilities for a cash token event.

FIG. 8 illustrates a method 440 for generating the event combinations and probabilities for each event (step 406 of FIG. 6).

At a first step, the signals 602 from a single event 606 are decomposed into an event weight portion and a force location portion. The event weight portion is the change in the magnitude of the signals over the event 606. The force location portion is based on the relative changes of the different signals over the event 606.

A list of possible event combinations is generated 444. The list is generated from all possible combinations of all cash tokens that may be received. The list includes single and multiple cash tokens being added and removed. A number of different criteria can be included to reduce the list of possible event combinations, including the maximum number of cash tokens that may be added in a single event (for example 20 coins or 5 notes), the type of cash tokens, and whether or not a single event may involve tokens being added to multiple compartments 138.

The likelihood of each event combination being correct, based on the weight portion of the signals 602, is then calculated at a next step 446*a*.

To calculate the likelihood of an event combination being correct based on the weight portion, the expected weight change of the event combination is calculated and compared to the actual weight change. This difference is then compared to statistical models, stored in the memory 514, to calculate the possibility of the combination being correct.

Statistical models are stored for each denomination cash token that may be received in the drawer 100. The model shows the weight distribution of a sample of coins of the same value. The weight of the cash tokens can vary due to damage, or accumulation of matter. The expected weight of the transaction is based on the average (mean or mode) weight for the particular token (or an officially recognised weight), and the probability is based on the required variation to achieve the measured weight.

The likelihood of each event combination being correct, based on the force location portion of the signals 602, is also calculated at a step 446*b*.

The force location data is analysed in a similar manner. Firstly, the force location portion of the signals 602 are analysed to determine a measured location of the event.

In the example with two force sensing devices 124 and a four-by-one cash tray, the measured signal from the two force sensing devices, each with two degrees, as discussed above, of freedom, will vary linearly as the position varies along the length of the cash tray 112. This can be scaled to the three sensing device 124 case.

For an event involving a single cash token (or a single compartment 138), the determined location may correspond to the location the cash token(s) was added or removed. For a transaction involving multiple compartments 138, the determined location may represent an average location.

Then, at step 446*b*, the likelihood of each event combination being correct is calculated based on comparison of an expected position for each event combination and the measured position. The expected position is based on each different value cash token being associated with a respective compartment.

As with the weight change, the likelihood is found by comparison to a model which includes a distribution of sample data for cash tokens being added to each compartment 138.

The model for force location may treat each compartment 138 as having a single average position, or a distribution over the entire surface of the compartment 138, with the probability of cash token causing a force at a particular point varying over the surface of the compartment 138.

The two probabilities for each event combination are then combined, and multiplied by the prior probability, to give a set of event probabilities for each event. The set of event probabilities includes a list of event combinations for each event, each event combination associated with a probability that it is correct.

The prior probability is based the success rate of each algorithm, and the known accuracy of the different measurements. The success rate is determined by calibration against known events, and the accuracy is determined based on known information about the force sensing devices 112 and the like.

A transaction may include a number of events, each with a list of event combinations that may have caused the signals 602 measured during the event. The list of transaction combinations is generated based on the different event combinations for all the events in the transaction. The probabilities for each individual event combination are combined to give a first transaction probability for each transaction combination.

The total weight change for the whole transaction is analysed in a similar manner the weight change for a single event. However, instead of generating a new list of combinations to consider, the list of transaction combinations is used. This generates a second transaction probability for each possible transaction combination.

The first and second transaction probabilities are combined, to give a final probability for each possible transaction combination.

The combination of probabilities may be a simple arithmetic combination, or not. Instead the data can be analysed in feature space, to help eliminate unlikely possibilities.

Determining the probabilities associated with the event combinations and/or the transaction combinations may include additional input from a previous transaction algorithm. The previous transaction algorithm includes data on previous transactions, and identifies commonly used combinations of coins. The combination algorithm then weights probabilities based on which combinations are used more frequently.

The data on the previously used transactions can be based on a single PoS system 500 only, or on data from multiple systems 500 at the same or different locations. The different locations may be similar types of locations (for example supermarkets) or any locations. The data may include some calibration data recorded before the PoS system 500 starts use and/or may be update continually or at regular intervals.

Determining the probabilities associated with transaction combinations may also include information extracted from the noise portions of the signals. For example, an event counting algorithm may monitor the ratio between the change in the signal from each force sensing device 124. When the ratio change above a threshold (i.e. when one of the signals is changing by more than the others), this is determined to be an event, allowing the total number of events to be determined.

Furthermore, where short events or very close events are included, the probability may be weighed against combinations including these.

It will be appreciated, that the force sensing devices 124 may measure the force continuously, or at regular intervals (e.g. 5 ms, 50 ms etc. . . . ). Furthermore, the force sensing devices 124 may only be turned on at the start of the transaction, or may be on continuously. In the case where the force sensing devices are on continuously, the measurement interval may be different during a transaction.

In addition, the method may include the optional step of applying a cross-talk filter to the signals, before any further analysis. While the use of kinematic mounts 122 reduces mechanical cross-talk, it does not eliminate it. Cross-talk can originate from a force acting on more than one sensor, and also from the cash tray flexing. The kinematics mounts act on the cross-talk from a force acting on more than one sensor, but not the cross-talk from flexing. Filters can be used to remove this cross-talk from the signals, in a manner known in the art.

As discussed above, automatically tracking the contents of the cash drawer 100 allows an owner or operator of the cash drawer 100 to know the contents at the end of the day, without undertaking a manual count. It also allows for warning to be generated when one or more compartments of the cash drawer need to be emptied/refilled, reducing operator the risk of operator error, and the need for operator training.

In addition, at least some implementations allow individual transaction to be checked with improved accuracy, in real time as the transactions are occurring. In at least some implementations, the use of kinematic mounts with the method provides further improvements in accuracy, as it allows events to be detected with greater accuracy.

This also allows the contents of the cash tray 112 to be known at any time, without a physical count. This can be useful for insurance purposes, since knowing information on exactly what is lost, for example in the case of theft of fire, can reduce premiums compared to knowing only estimates, or assumptions.

Furthermore, the PoS system 500, or a central control system to which the PoS system 500 is connected, may be configure to generate an alert when one or more of the compartments 138 is full or empty. In this way, the compartments(s) can be emptied and/or refilled to a starting level that gives cash tokens for change.

Furthermore, since each individual transaction is tracked, there is no need for different operating personnel to use different cash trays 112, as any discrepancies between the contents and data about the transactions can be tracked to an individual operator. This can also be used to detect:

If a particular operator is making fraudulent or erroneous transactions;

Performance metrics about how quickly operators complete transactions and the like.

In the examples discussed above, the generation of a list of combinations includes a limit on the number of cash tokens involved in a transaction. However, in some scenarios, a large number of cash tokens may be added or removed from the cash tray 112. For example, if a compartment 138 is emptied or refilled, a large number of cash tokens may be added at once, from a bag.

The maximum number of tokens in the list of possible combinations may take this into account, and be larger than the maximum number of cash tokens that can be added or removed in any situation.

Alternatively, the PoS system 500 may be arranged to receive a notification (for example through user input) that one or more compartments 138 are being emptied or refilled. This may either temporarily suspend the limit, or suspend the automatic tracking of the content, and instead allow a manual update of the contents.

It should further be noted that the list of generated event combinations may also include combinations that include user errors, for example placing a cash token in the wrong compartment. In this way, errors can be included. Furthermore, if an error is detected as being likely (e.g. the most probable combination), a warning may be provided during the transaction to allow an operator to correct the error.

It will be appreciated that the methods discussed above can be implemented with any of the PoS systems 500 discussed. Furthermore, the design of cash drawer 100, including a lid 102c, is by way of example only, and the above system and methods could be implemented with any PoS design (for example with a cash drawer 100 that slides in and out).

Furthermore, the above systems and methods can be implemented with coins and/or notes. Furthermore, the coins and notes may be provided in the same cash tray 112, or in different cash trays 112.

It will be appreciated that the above methods may be performed locally, by the controller 512 of the PoS system 500, or at a central location, or distributed between the two.

The mounts 122, force sensing devices 124 and cash tray 112 are compatible with existing PoS system infrastructure 500 (e.g. the drawer 100 is of standard size), and so existing PoS systems 500 can be upgraded to be as described above.

What is claimed is:

1. A method for determining a change in contents of a cash tray, comprising:
    determining an occurrence of one or more cash token events occurring in a transaction of a point of sale system, each event comprising addition and/or removal of one or more cash tokens from the cash tray;
    for each cash token event, determining a weight change of the cash tray for the event and a location on the cash tray of the event;
    generating an event combination probability for each of a plurality of possible event combinations of cash token added and/or removed from the cash tray, wherein the event combination probability is a probability that the possible event combination is the correct combination;
    determining a total change in weight of the cash tray in the transaction;
    based on at least one of the weight change for each event, the location for each event, and the total change in weight of the cash tray, generating a plurality of possible transaction combinations of cash tokens added and/or removed from the cash tray in the transaction, each transaction combination having an associated transaction combination probability;
    for each possible event combination, determining at least one of an expected weight change of the cash tray or an expected force position in the cash tray;
    comparing at least one of the expected weight change with the measured weight change of the cash tray or the expected force position with the measured position; and
    based on at least one of the comparison of the weight change or the comparison of the force position, determining a probability that each combination is correct.

2. The method of claim 1, comprising:
    measuring at least a first force signal and a second force signal, the first force signal representative of force exerted by the cash tray at a first location, and the second force signal representative of force exerted by the cash tray at a second location; and
    analyzing the first force signal and the second force signal to determine the occurrence of one or more cash token events, weight and location of the cash tokens added and/or removed in each cash token event, and the total change in weight of the cash tray.

3. The method of claim 2, comprising:
    dividing the force signals measured in the transaction into event windows, each event window comprising a subsection of the transaction in which one cash token event occurs:
    dividing the measured force signals into sub-windows.

4. The method of claim 3, wherein dividing the measured force signals into sub-windows comprises:
    determining if the measured force signal in each sub-window is constant or non-constant; and
    defining an event window as one or more consecutive non-constant sub-windows with constant periods of one or more constant sub-windows before and after the consecutive non-constant sub-windows.

5. The method of claim 4, wherein a sub-window is determined to be constant or non-constant based on at least one of an average signal change or a range of measured signal.

6. The method of claim 5, wherein a sub-window is determined to be constant if at least one of the averaged measured signal or the range of measured signal is below a stability threshold.

7. The method of claim 5, wherein a sub-window is determined to be constant if at least one of the average measured signal or the range of the measured signal is above an event threshold, and a noise sub-window otherwise.

8. The method of claim 5, wherein determining the location of the measured force of an event is based on a relative change of an average magnitude of the forces represented by the first and second force signals.

9. The method of claim 2, comprising:
determining the total change in weight of the cash tray, over an event or over the transaction, based on a change in average magnitude of the forces represented by the first and second force signals.

10. The method of claim 1, comprising:
identifying the transaction combination with the highest probability as the change in the contents of the cash tray.

11. The method of claim 10, further comprising:
receiving a known starting contents of the cash tray, and storing the known starting contents as the contents of the cash tray;
for each transaction involving the cash tray, determining the change in the contents of the cash tray; and
after each transaction, altering the stored cash tray contents based on the determined change in the contents of the cash tray.

12. The method of claim 1, wherein the location of the cash tray event is an average position of the cash tray event.

13. A point of sale system comprising:
a cash drawer having a cash tray; and
a controller arranged to determine the change in the contents of the cash tray by performing the method of claim 1.

14. The point of sale system of claim 13, wherein the cash tray comprises a plurality of containers, each container for holding a plurality of cash tokens, and wherein the cash drawer comprises two or more force measuring devices arranged to measure the force exerted by the cash tray.

15. The point of sale system of claim 14, wherein the cash tray is coupled to each of the force measuring devices through a kinematic support arranged such that a downward force on the cash tray is converted into a movement of the mount, such that the cash tray is not deflected by the force.

16. The point of sale system of claim 13, wherein the cash tray is removably received in the cash drawer.

17. The method of claim 1, wherein the transaction combinations are determined from all possible combinations of the event combinations for all the events occurring in a first period.

18. The method of claim 17, wherein the transaction combination probability of each transaction combination is based on at least one of the event combination probabilities or a weight change probability based on the weight change measured over the first period.

19. The method of claim 1, wherein determining the probability that each combination is correct comprises:
comparing the different between the expected force position and the measured position with a statistical distribution of a variation in the measured position of real cash tokens inserted in the cash tray.

20. A cash drawer comprising:
at least two force measuring devices;
a cash tray having a plurality of containers, each container for holding a plurality of cash tokens, wherein the cash tray is coupled to each of the force measuring devices through a kinematic support; and
a controller arranged to determine the change in the contents of the cash tray by performing the method of claim 1.

* * * * *